Jan. 30, 1962 B. L. DAVIS ETAL 3,019,150

TAPE CAPACITOR

Original Filed March 15, 1955

INVENTORS
BENJAMIN L. DAVIS
WILBUR C. NYBERG

BY R. I. Tompkins

ATTORNEY 3,019,150
TAPE CAPACITOR

Benjamin L. Davis, Washington, D.C., and Wilbur C. Nyberg, Youngstown, Ohio, assignors to the United States of America as represented by the Secretary of the Navy Original application Mar. 15, 1955, Ser. No. 494,592. Divided and this application July 23, 1958, Ser. No. 750,542
13 Claims. (Cl. 156—184)
(Granted under Title 35, U.S. Code (1952), sec. 266)

The invention described herein may be manufactured and used by or for the Government of the United States of America for governmental purposes without the payment of any royalties thereon or therefor.

This application is a division of our copending application Serial No. 494,592, filed March 15, 1955, now abandoned.

The present invention relates to a tape capacitor and more particularly to a tape capacitor which is made from a modular wafer, and tape of certain physical characteristics.

An object of the present invention is to provide a capacitor for use in conjunction with a modular system of electronic components.

Another object is to provide a capacitor which is relatively easy to manufacture, and is made of readily available material.

A further object is to provide a capacitor which has a high capacitance, in a minimum volume.

Still another object is to provide a capacitor construction which may conveniently be made in a variety of shapes and sizes.

Other objects and many of the attendant advantages of this invention will be readily appreciated as the same becomes better understood by reference to the following detailed description when considered in connection with the accompanying drawings wherein.

Figure 1:
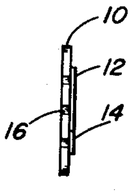
FIG. 1 is a side view of a wafer having one plate of a capacitor thereon.
Figure 2:
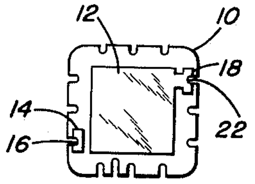
FIG. 2 is a plan view of the device of FIG. 1.
Figure 3:
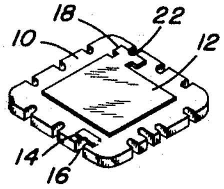
FIG. 3 is a perspective view of the device of FIG. 1.

Referring now to the drawings, wherein like reference characters designate like or corresponding parts throughout the several views, there is shown in FIGS. 1, 2 and 3 a generally square, notched wafer 10 having on one surface a silvered pattern 12 covering the large central part thereof and a smaller silvered pattern 14 near a notch 16. The silvered pattern 12 is generally square, although this shape is not critical, and has a leader 18 connecting it to the notch 22. The wafer is made of an insulating material, preferably a ceramic, but may also be made of glass, or of plastic laminations. The patterns 12 and 14 preferably contain silver particles and a resin binder to constitute them as conductors, although other conductive materials may be used instead of silver. Pattern 12 forms one plate of the capacitor, and pattern 14 a lead for the other plate.

The patterns 12 and 14 may be placed on the wafer 10 by screening, photo offset printing, painting through a stencil, or any other rapid means. After deposit the patterns are wet and weak until wafer 10 has been fired at an elevated temperature (1200°–1500° F. for ceramic wafers or 800°–850° F. for glass wafers or an appropriately lower temperature for plastic laminations) to permanently metalize the patterns.

Figure 4:
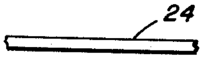
FIG. 4 is a side view of a strip of tape forming a component of the capacitor of the invention.

In FIG. 4 there may be seen a piece of tape 24, which may be made of asbestos paper, glass fibers, paper, or plastic. It is preferably porous, for a reason to be hereinafter set forth. The tape 24 is made into a conductor by any convenient means. Preferably it is sprayed on both sides with a formulation comprising silver powder in a binder and solvent. The silver is represented by the dots in FIG. 5. The binder component may be a silicone resin or an epoxy resin, for instance. The solvent component may be toluene, benzene or butyl cellosolve, for instance.

Figure 6:
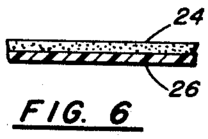
FIG. 6 is a side view of the tape of FIG. 5 with a coating shown in section, applied to one surface thereof.
Figure 7:
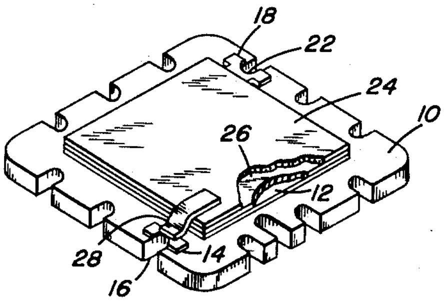
FIG. 7 is a perspective view, partly broken away, of a capacitor made according to the invention.

After the tape 24 has been sprayed, and is heavily impregnated with silver, it is sprayed again, on one side only, with a dielectric material 26, thus giving the form of tape shown in FIG. 6. Dielectric 26 is comprised of a resin binder similar to the binder noted above, and finely ground ceramic dielectric materials. The dielectric materials are preferably of the titanate family such as barium titanate and strontium titanate, and may comprise a mixture of two or more of such titanates. The materials are of a particle size of the order of 5 microns or smaller. Dielectric 26 also contains a solvent similar to the above noted solvent. In some instances, where a very low capacitance will suffice, the titanate may be omitted and a thicker coat of resin employed.

The tape, as shown in FIG. 6, is cut into pieces the size of the pattern 12 on wafer 10, in the embodiment shown, the tape is cut into a square. The square of tape is placed on the pattern, care being taken to insure that no air is trapped under the tape. At this time, the resin of the pattern 12 has been fired off in the case of ceramic or glass wafers or has hardened in the case of plastic wafers but the resin employed as a binder in dielectric 26 being in its uncured state is tacky, so that a gluing action is obtained. Conveniently, any air which may be entrapped by the square of tape is forced out through the pores thereof by the application of pressure (less than 50 p.s.i.). It will be apparent that pattern 12 forms one plate of the capacitor; material 26, the dielectric and tape 24, the other plate of the capacitor. A leader 28 of the tape of FIG. 5 connects the tape 24 with pattern 14, a tacky resin binding the two together. By depositing a suitable conductor on the surface of the notches 16 and 22, wires may be placed in these notches to connect the tape capacitor thus formed into an electric circuit. Where desirable, other squares of the tape of FIG. 6 may be stacked on the first square of tape to increase the capacity of the capacitor. The assembled tape capacitor is next cured under heat, the usual curing process taking place at about 400° F. A wide degree of latitude in temperature and time is possible, however, depending upon the dielectric material and the resin binder. This curing produces a permanent bond of the temporary bond formed by the tacky resin employed as a binder in dielectric 26. At any time prior to the curing process the assembled capacitors may be subjected to ordinary handling to continue the manufacturing process or to package and store for later curing.

It will be readily understood that the size of the capacitor may be varied by varying the area, the amount of titanate in dielectric 26, and by varying the thickness of the dielectric layer.

Figure 5:
FIG. 5 is a side view of the tape of FIG. 4 after it has been treated.
Figure 8:
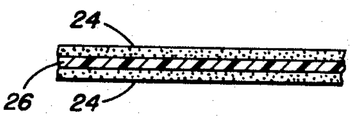
FIG. 8 is a side view of a laminated tape used in a modification of the invention, with the coating shown in section.
Figure 9:
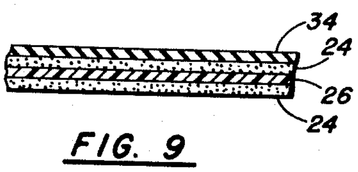
FIG. 9 is a side view of a laminated tape used in a second modification employing an insulating layer and coating, both being shown in section.
Figure 11:
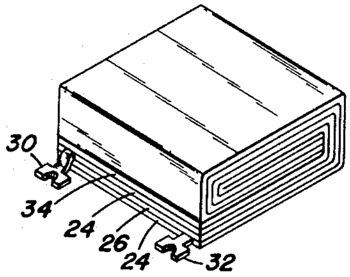
FIG. 11 is a perspective view of a modification using the tape shown in FIG. 9.
Figure 10:
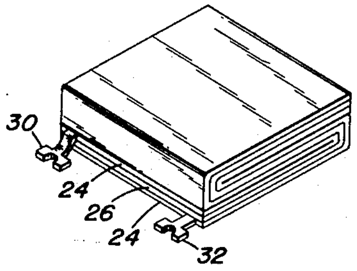
FIG. 10 is a perspective view of a modification of the invention using the tape shown in FIG. 8.

In FIG. 8 there is shown a piece of tape made of two layers of the tape 24 of FIG. 5, separated by a layer dielectric material 26. The tape of FIG. 8 may be folded or accordion pleated resulting in a self-supporting capacitor as is illustrated in FIG. 10. Similarly, if it be desired a self-supporting capacitor may be formed by coiling or folding a piece of tape over itself by utilizing appropriate insulating material 34. Such a piece of tape is shown in FIG. 9 and when folded as in FIG. 11 the two strips of tape 24, 24 are prevented from contacting each other by insulating layer 34. Leaders 30 and 32 provide connections to each of the plates of the folded self-supporting unit. Although this is not necessary such a condenser may be mounted on a wafer in which case leaders 30 and 32 would be connected to appropriate silvered notches.

As in the construction previously discussed the tape illustrated in FIG. 8 may be subjected to ordinary handling and may be stored for later use. After having been folded or accordion-pleated as in FIG. 10 or after having added insulation layer 34 to form the tape shown in FIG. 9 and then folded as in FIG. 11 the self-supporting capacitor produced thereby must still undergo the final curing process to produce a permanent bond.

Obviously many modifications and variations of the present invention are possible in the light of the above teachings. It is therefore to be understood that within the scope of the appended claims the invention may be practiced otherwise than as specifically described.

What is claimed is:

1. The method of making a capacitor comprising placing a conductive pattern on a non-conductive carrier, impregnating a porous tape with conductive material in a binder component and solvent, coating one side of the resulting conductive tape with a dielectric material in a binder, placing said prepared tape on said pattern with the dielectric material adjacent said pattern said binder being in its uncured state, applying pressure to urge said tape against said pattern excluding all entrapped air and curing the assembled structure under heat whereby said conductive tape, dielectric coating, conductive pattern and non-conductive carrier become permanently bonded into a composite unit.

2. The method described in claim 1 in which the pattern is deposited on the carrier by screening.

3. The method described in claim 1 in which the porous tape is impregnated by spraying.

4. The method described in claim 1 in which the dielectric coating is applied by spraying.

5. The method of making a capacitor comprising forming a carrier of non-conductive material, placing a conductive pattern on said carrier, impregnating a porous tape with conductive material in a binder component and solvent, coating one side of the resulting conductive tape with a dielectric material in a binder, placing said prepared tape on said pattern with the dielectric material adjacent said pattern said binder being in its uncured state, applying pressure to urge said tape against said pattern excluding all entrapped air and curing the assembled structure under heat whereby said conductive tape, dielectric coating, conductive pattern and non-conductive carrier become permanently bonded into a composite unit.

6. The method of making a capacitor comprising forming a carrier of non-conductive material, depositing a conductive pattern on said carrier, firing said carrier and pattern at an elevated temperature to permanently metalize said pattern and to permanently bond said pattern to said carrier, impregnating a porous tape with conductive material in a binder component and solvent, coating one side of the resulting conductive tape with a dielectric material in a binder, placing said prepared tape on said pattern with the dielectric material adjacent said pattern said binder being in its uncured state, applying pressure to urge said tape against said pattern excluding all entrapped air and curing the assembled structure under heat whereby said conductive tape, dielectric coating, conductive pattern and non-conductive carrier become permanently bonded into a composite unit.

7. The method of making a capacitor comprising forming a carrier of non-conductive material, depositing a conductive pattern on said carrier, firing said carrier and pattern at an elevated temperature to permanently metalize said pattern and to permanently bond said pattern to said carrier, impregntaing a porous tape with conductive material in a resin binder component and solvent, coating one side of the resulting conductive tape with a dielectric material in a resin binder, cutting a portion from said tape, placing said portion on said pattern with the dielectric material adjacent said pattern said resin binder being in its uncured state, applying pressure to urge said portion against said pattern excluding all entrapped air and curing the assembled structure under heat whereby said portion of conductive tape, dielectric coating, conductive pattern and non-conductive carrier become permanently bonded into a composite unit.

8. The method of making a capacitor comprising impregnating a porous tape with conductive material in a binder component and solvent, coating one side of a first length of the resulting conductive tape with a dielectric material in a binder, placing one side of a second length of said conductive tape against said dielectric coating on said first length said binder being in its uncured state, applying pressure urging said first and second lengths of tape toward one another excluding all entrapped air, applying an insulating layer to one side of the combined lengths of tape, folding a portion of the resulting combination of layers over itself at least one time, curing the folded combination of layers under heat whereby said lengths of conductive tape and said coating of dielectric disposed therebetween become permanently bonded.

9. The method of making a capacitor comprising impregnating a porous tape with conductive material in a binder component and solvent, coating one side of a first length of the resulting conductive tape with a dielectric material in a binder, placing one side of a second length of said conductive tape against said dielectric coating on said first length said binder being in its uncured state, applying pressure urging said first and second lengths of tape toward one another excluding all entrapped air, applying an insulating layer to one side of the combined lengths of tape, coiling the resulting combination of layers, curing the coiled combination of layers under heat whereby said lengths of conductive tape and said coating of dielectric disposed therebetween become permanently bonded.

10. The method of making a capacitor comprising impregnating a porous tape with conductive material in a binder component and solvent, coating one side of a first length of the resulting conductive tape with a dielectric material in a binder, placing one side of a second length of said conductive tape against said dielectric coating on said first length said binder being in its uncured state, applying pressure urging said first and second lengths of tape toward one another excluding all entrapped air, accordion-pleating the resulting combination of layers, curing the pleated combination of layers under heat whereby said length of conductive tape and said coating of dielectric disposed therebetween become permanently bonded.

11. The method of making a capacitor comprising impregnating a porous tape with conductive material in a binder component and solvent, coating one side of the resulting conductive tape with a dielectric material in a binder, placing two lengths of said coated tape together with said coated sides adjacent one another said binder being in its uncured state, applying pressure urging said lengths of tape toward one another excluding all entrapped air, applying an insulating layer to one side of the combined lengths of tape, folding a portion of the resulting combination of layers over itself at least one time, curing the folded combination of layers under heat whereby said lengths of conductive tape and said coating of dielectric disposed therebetween become permanently bonded.

12. The method of making a capacitor comprising impregnating a porous tape with conductive material in a binder component and solvent, coating one side of the resulting conductive tape with a dielectric material in a binder, placing two lengths of said coated tape together with said coated sides adjacent one another said binder being in its uncured state, applying pressure urging said lengths of tape toward one another excluding all entrapped air, coiling the resulting combination of layers, curing the coiled combination of layers under heat whereby said lengths of conductive tape and said coating of dielectric disposed therebetween become permanently bonded.

13. The method of making a capacitor comprising impregnating a porous tape with conductive material in a binder component and solvent, coating one side of the resulting conductive tape with a dielectric material in a binder, placing two lengths of said coated tape together with said coated sides adjacent one another said binder being in its uncured state, applying pressure urging said lengths of tape toward one another excluding all entrapped air, accordion-pleating the resulting combination of layers, curing the pleated combination of layers under heat whereby said lengths of conductive tape and said coating of dielectric disposed therebetween become permanently bonded.

References Cited in the file of this patent

UNITED STATES PATENTS 1,702,993 Brown ---------------- Feb. 19, 1929

FOREIGN PATENTS 691,240 Great Britain ------------ May 6, 1953

718,811 Great Britain ----------- Nov. 24, 1954